(12) United States Patent
Cai et al.

(10) Patent No.: US 10,635,786 B2
(45) Date of Patent: Apr. 28, 2020

(54) METHODS AND APPARATUS FOR ENCRYPTING MULTIMEDIA INFORMATION

(71) Applicant: Macau University of Science and Technology, Macau (CN)

(72) Inventors: Zhanchuan Cai, Macau (CN); Ting Lan, Macau (CN)

(73) Assignee: MACAU UNIVERSITY OF SCIENCE AND TECHNOLOGY, Macau (CN)

( * ) Notice: Subject to any disclaimer, the term of this patent is extended or adjusted under 35 U.S.C. 154(b) by 193 days.

(21) Appl. No.: 15/458,995

(22) Filed: Mar. 15, 2017

(65) Prior Publication Data
US 2018/0270054 A1    Sep. 20, 2018

(51) Int. Cl.
*G06F 21/10*   (2013.01)
*G06F 21/60*   (2013.01)

(52) U.S. Cl.
CPC ............ *G06F 21/10* (2013.01); *G06F 21/602* (2013.01)

(58) Field of Classification Search
CPC ............................... H04L 9/0838; G06F 21/10
See application file for complete search history.

(56) References Cited

U.S. PATENT DOCUMENTS

| | | | | |
|---|---|---|---|---|
| 6,044,156 A * | 3/2000 | Honsinger | ............ | G06T 1/0021 380/54 |
| 6,134,571 A * | 10/2000 | Kresch | ................. | G06F 17/147 382/260 |
| 6,246,796 B1 * | 6/2001 | Horikoshi | ............ | G03H 1/0005 375/E7.09 |
| 2007/0098063 A1 * | 5/2007 | Reznic | ................. | H04N 11/044 375/240.2 |
| 2007/0297612 A1 * | 12/2007 | Feder | ...................... | H04L 9/065 380/270 |
| 2009/0327918 A1 * | 12/2009 | Aaron | ................... | H04L 1/0009 715/751 |
| 2010/0331041 A1 * | 12/2010 | Liao | ................. | H04M 1/72555 455/556.1 |
| 2015/0227747 A1 * | 8/2015 | Gassi | ................... | G06F 16/122 713/193 |
| 2018/0165466 A1 * | 6/2018 | Rad | ........................ | H04N 19/60 |

OTHER PUBLICATIONS

Gilbert, Fractal Geometry Derived from Complex Bases, The Mathematical Intelligence vol. 4, pp. 78-86 (Year: 1982).*

(Continued)

*Primary Examiner* — Luu T Pham
*Assistant Examiner* — Harvey I Cohen
(74) *Attorney, Agent, or Firm* — Eagle IP Limited; Jacqueline C. Lui

(57) ABSTRACT

A method improves information security by generating a key with which a first multimedia content is encrypted into a second multimedia content. The method generates a first representation for the first multimedia content and a second representation for the second multimedia content on a complex plane, and improves the information security by generating the key by determining a relationship between the first representation and the second representation on the complex plane such that the first multimedia content is encrypted into the second multimedia content with the relationship as the key.

18 Claims, 12 Drawing Sheets

(56) References Cited

OTHER PUBLICATIONS

Koren et a., On Classes of Positive Negative and Imaginary Radix Number Systems, IEEE,1981 (Year: 1981).*

Qian et al., Reversible Data Hiding in Encrypted JPEG Bitst, IEEE Transactions on Multimedia, vol. 16, Issue 5, Aug. 2014, pp. 1486-1491 (Year: 2014).*

Wang et al., Security Analysis of Content-Based Watermarking Authentication Framework, IEEE, 2009 International Conference on Multimedia Information Networking and Security, Dec. 31, 2009 (Year: 2009).*

K. A. Thakoor,Cognitive mechanisms underlying the classification of reduced dimensionality, information rich image representations, IEEE Intelligent Systems, vol. 31, No. 2, pp. 9-20, 2016.

G. Wang, P. Shi, B. Wang, and J. Zhang, Fuzzy n-ellipsoid numbers and representations of uncertain multichannel digital information, IEEE Transactions on Fuzzy Systems, vol. 22, No. 5, pp. 1113-1126, 2014.

X. Q. Liu, and W. Q. Wang, Robustly Extracting Captions in Videos Based on Stroke-Like Edges and Spatio-Temporal Analysis, IEEE Transactions on Multimedia, vol. 14, No. 2, pp. 482-489, 2012.

L. Su, C. C. M. Yeh, J. Y. Liu, J. C. Wang, and Y. Yang, A Systematic Evaluation of the Bag-of-Frames Representation for Music Information Retrieval, IEEE Transactions on Multimedia, vol. 16, No. 5, pp. 1188-1200, 2014.

W. Zeng, K. Nahrstedt, P. A. Chou, A. Ortega, P. Frossard, and H. H. Yu, Introduction to the Special Issue on Streaming Media, IEEE Transactions on Multimedia, vol. 6, No. 2, pp. 225-229, 2004.

G. Bucci, R. Detti, V. Pasqui, and S. Nativi, Sharing Multimedia Data Over a Client-Server Network, IEEE Transactions on Multimedia, vol. 1, No. 3, p. 44, 1994.

I. Katai and J. Szabo, Canonical number systems for complex integers, Acta Scientiarum Mathematicarum, vol. 37, No. 3-4, pp. 255-260, 1975.

T. Jiang, and A.-H. Tan, Learning image-text associations, IEEE Transactions on Knowledge and Data Engineering, vol. 21, No. 2, pp. 161-177, 2009.

J. Westerhoff, Logical relations between pictures, Journal of Philosophy, vol. 102, No. 12, pp. 603-623, 2005.

H. C. Chua, A Tutorial on Data Representation Integers, Floatingpoint Numbers, and Characters, http://www3.ntu.edu.sg/home/ehchua/programming/java/datarepresentation.html, Last modified: Jan. 2014.

S. Gorn, R. W. Bemer, and J. Green, American standard code for information interchange, Communications of the ACM, vol. 6, No. 8, pp. 422-426, 1963.

M.-H. Horng, Vector quantization using the firefly algorithm for image compression, Expert Systems with Applications, vol. 39, No. 1, pp. 1078-1091, 2012.

Y. Huang, Z. Wu, L. Wang, and T. Tan, Feature coding in image classification: A comprehensive study, IEEE transactions on pattern analysis and machine intelligence, vol. 36, No. 3, pp. 493-506, 2014.

* cited by examiner

100 ⟶

Algorithm 1 Gaussian integer to 0 ~ 1 sequence algorithm

1: Gaussian integer $= U_0 + iV_0$
2: $base\ b = -1 + i$
3: function
4:    for $k = 0$ and $k \leqslant n$ and $k++$ do
5:       $U_{k+1} = (V_k - U_k + e_k)/2$
6:       $V_{k+1} = (-V_k + U_k - e_k)/2$
7:       $e_k = |(U_k - v_k)\ mod\ 2|$
8:    end for
9:    0 ~ 1 sequence is $e_n e_{n-1} \cdots e_1 e_0$
10: end function

Multiplication of $2 + 3i$ and $-1 - i$

Algorithm 2 Digital information to Gaussian integer

---

1: $0 \sim 1$ sequence $= e_n e_{n-1} \cdots e_1 e_0 . e_{-1} e_{-2} \cdots$
2: base $b = -1 + i$
3: $r_0 = 1$
4: $s_0 = 0$
5: function
6:     for $k = -m, k \neq 0$ and $k \leqslant n$ and $k++$ do
7:         For the integer part:
8:         $r_k = -r_{k-1} - s_{k-1}$
9:         $s_k = r_{k-1} - s_{k-1}$
10:        For the fractional part:
11:        $r_{k-1} = -\frac{r_k - s_k}{2}$
12:        $s_{k-1} = -\frac{r_k + s_k}{2}$
13:     end for
14:     for $k = -m$, and $k \leqslant n$ and $k++$ do
15:         $U_0 = \sum_{k=-m}^{n} e_k r_k$
16:     end for
17:     for $k = -m, k \neq 0$ and $k \leqslant n$ and $k++$ do
18:         $V_0 = \sum_{k=-m, k \neq 0}^{n} e_k s_k$
19:     end for
20:     Gaussian integer is $U + iV$
21: end function

| | | | | | |
|---|---|---|---|---|---|
| Real part | $-1.2142 \times 10^{83}$ | $4.5427 \times 10^{133}$ | $-2.6443 \times 10^{123}$ | $1.1009 \times 10^{107}$ | $-1.4770 \times 10^{115}$ |
| Imaginary part | $1.2142 \times 10^{83}$ | $1.7332 \times 10^{128}$ | $-2.6443 \times 10^{123}$ | $-2.4049 \times 10^{111}$ | $-4.9254 \times 10^{115}$ |

Figure 8

Algorithm 3 Coding

1: function $(M_1)$
2: $\quad M_1 \to G(x) \to G(M_1) = N_{M_1}$
3: $\quad N_{M_1} \to F_{-1+i}(N_{M_1}) = (p_0, q_0) = P_0$
4: end function
5: function $(S)$
6: $\quad S \to G(x) \to G(S) = N_S$
7: $\quad N_S \to F_{-1+i}(N_S) = (p_1, q_1) = P_1$
8: end function
9: The key is $R(P_0, P_1) : P_0 \leftrightarrow P_1$

Figure 9

Algorithm 4 Decoding

1: function
2: $\quad M_1 \to G(x) \to G(M_1) = N_{M_1}$
3: $\quad N_{M_1} \to F_{-1+i}(N_{M_1}) = (p_0, q_0) = P_0$
4: $\quad P_1 : R(P_0, P_1) \leftrightarrow P_0$
5: $\quad P_1 \to F_b^{-1}(p_1, q_1) \to F_{-i+1}^{-1}(p_1, q_1) = N_S$
6: $\quad N_S \to G^{-1}(N) \to G^{-1}(N_S) = S$
7: end function

Figure 10

P  Q
 
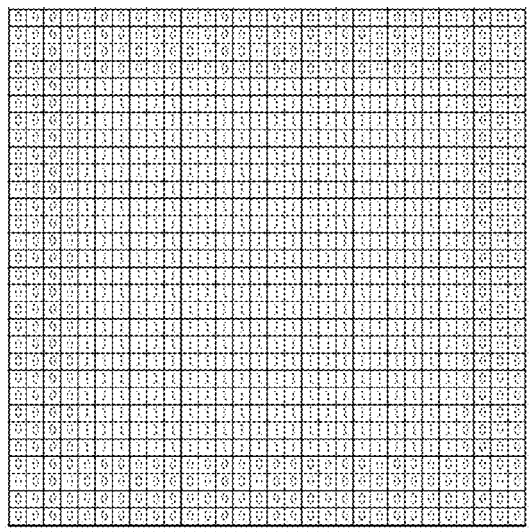 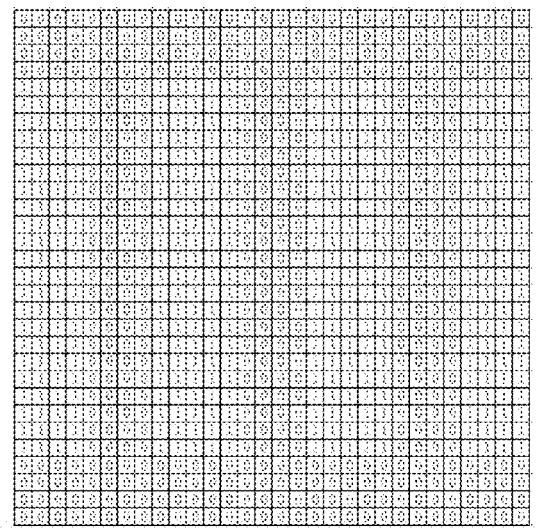
Figure 11

METHODS AND APPARATUS FOR ENCRYPTING MULTIMEDIA INFORMATION

FIELD OF THE INVENTION

The present invention generally relates to information security, and more particularly to methods and apparatus that improve information security.

BACKGROUND

Multimedia information or multimedia contents, including text, images, charts, audio, and video etc., is generally distributed to users through various communication channels. Private information or confidential data is often encrypted with various methods to avoid unauthorized access, use, disclosure, modification, inspection and recording. Hence, considerable sums have been spent in information technology aiming to prevent external intrusions and increase information security.

New methods and apparatus that assist in advancing technological needs and industrial applications in the field of information security are desirable.

SUMMARY OF THE INVENTION

One example embodiment is a method that improves information security by generating a key with which a first multimedia content is encrypted into a second multimedia content. The method generates a first representation for the first multimedia content and a second representation for the second multimedia content on a complex plane. The method improves the information security by generating the key by determining a relationship between the first representation and the second representation on the complex plane such that the first multimedia content is encrypted into the second multimedia content with the relationship as the key.

Other example embodiments are discussed herein.

BRIEF DESCRIPTION OF THE DRAWINGS

FIG. 1 shows a table illustrating coding a Gaussian integer into a binary sequence in accordance with an example embodiment.

FIG. 2 shows a multiplication operation in accordance with an example embodiment.

FIG. 5 shows a graph illustrating converting multimedia information into a Gaussian integer in accordance with an example embodiment.

FIG. 8 shows a table illustrating complex numbers corresponding to binary images in accordance with an example embodiment.

FIG. 9 shows a table illustrating a coding process in accordance with an example embodiment.

FIG. 10 shows a table illustrating a decoding process in accordance with an example embodiment.

FIG. 11 shows binary images with size of 30×30 pixels in accordance with an example embodiment.

DETAILED DESCRIPTION

Figure 3:
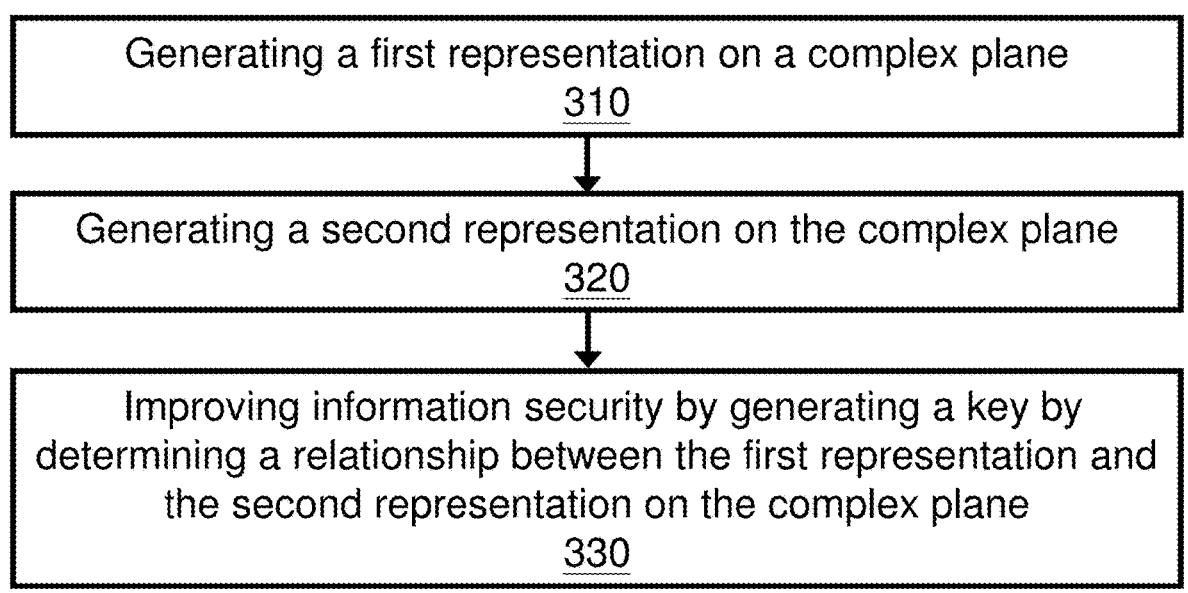
FIG. 3 shows a method in accordance with an example embodiment.

Example embodiments relate to methods and apparatus that provide novel schemes to improve information security for multimedia contents.

Many security technologies have been developed to encrypt multimedia information or multimedia content that is transmitted over various communication channels, such as the Internet. Existing or conventional schemes or algorithms, such as Data Encryption Standard (DES) scheme, cannot generate a key derived from a relationship between one multimedia information with another because the relationship is difficult to be determined by using conventional schemes. Furthermore, existing schemes are irreversible. For example, a numerical matrix A is obtained by the sum of two numerical matrices M and N with the same dimension. However, the two numerical matrices M and N cannot be obtained by knowing the numerical matrix A.

Example embodiments solve the above problems and provide novel technical solutions in new methods and apparatus to protect multimedia information from unauthorized access. Example schemes function in an unconventional way to generate a key that is derived from the relationship between two multimedia contents and that is used to encrypt any of the two multimedia contents.

Example embodiments solve the above problems and provide novel technical solutions in which multimedia information is represented on or mapped onto a complex plane such that determination of the relationship between different multimedia information is transformed into a problem of complex operation that can be handled easily with plane geometry. A key can be generated with great flexibility due to a great variety of complex operations (such as addition, subtraction, multiplication, and division, and combination thereof, etc.).

One example embodiment projects or maps two multimedia contents onto a complex plane to generate two representations. The relationship of the two representations can be determined with plane geometry as a key to encrypt or embed one of the two multimedia contents into the other to protect confidential data. Furthermore, example embodiments are advantageous over conventional schemes because of reversibility. For example, addition of two matrices are reversible based on example schemes.

Example schemes are also advantages because of algorithmic simplicity. The process of determining the relationship is transformed into a problem of plane geometry that can be easily tackled by vector transformation (e.g., rotation and expansion). The algorithmic simplicity of example embodiments also reduces processor execution runtime when processed by a computer device, and thus further benefits computer technology by reducing computational complexity such that information encryption can be processed (e.g., constructed) more efficiently, which reduces resource consumption such as memory usage and processing time. Example methods thus can be executed by a computer device or system with lower requirements for hardware to perform information processing and thus mitigate demand of costly computers with expensive chips, memory, and other internal electronic components.

In an example embodiment, a method of complex base coding is used to represent multimedia information or multimedia contents on a complex plane and establish the relationships between different multimedia information with a method of plane geometry. The complex base coding selects one or more complex numbers as a base in a positional number system. By way of example, a complex number z is expressed in a form of z=x+iy, where i is an imaginary unit such that $i^2=1$. The complex number z is called Gaussian number when x and y are rational numbers. In an example embodiment, according to the positional number system, a complex number can be written as $$Z = \sum_{j=-\infty}^{k} r_j b^j, k = 0, 1, 2, \ldots.$$

That is, Z can be represented based on a base b. In such Z representation, if all allowed $r_j$ are the complete residue system modulo b, then the standard algorithm of representation number based on integer bases can be extended to complex bases.

By way of example, a Gaussian number can be represented by a complex base b=n+i and b=−n−i, where n is a positive integer (i.e., a whole number greater than zero). If all complex numbers can be represented by a base, this base is called an appropriate base, such as b=−1+i and b=−1−i. If not all complex numbers can be represented by a base, this base is called an inappropriate base, such as b=1−i and b=1+i.

By way of example, digital computer processing object can be represented as a binary sequence or binary code consisting of 0 and 1 (i.e., 0~4 sequence). Namely, the set can be written as S={0, 1}. For a given Gaussian number $U_0+iV_0$, consider a complex base b=ξ+iη, where ξ and η are rational numbers. If ξ and η are coprime, then S={0, 1, 2, . . . , $ξ^2+η^2−1$} is the complete residue system modulo b=ξ+iη.

If ξ and η share a common factor, which indicates there is a whole number greater than one such that both ξ and η are divisible by the whole number, then the complete residue system modulo b=ξ+iη must contain a complex number whose imaginary part is not zero. In an example embodiment, in order to represent Gaussian numbers based on a complex base effectively, let η=±1. For all the powers $(ξ+iη)^j$ of base b, the imaginary part of $(ξ+iη)^j$ can be divided by n.

In an example embodiment, a complex base is selected as b=ξ±i, and a numeral symbol set S={0, 1, 2, . . . , $ξ^2$}. In another example embodiment, the numeral symbol set is defined as S={0, 1} based on characteristics of the computer data storage, and then ξ=±1 and η=±1. In this example embodiment, there are four complex bases: 1+i, 1−i, −1+i, and −1−i, where −1+i and −1−i are appropriate bases and they are conjugate to each other, while 1+i and 1−i are inappropriate bases. These four bases can be written as b=ξ+iη, where ξ=±1 and η=±1.

In an example embodiment, the complex base b=−1+i, and the complex numbers can be represented on basis of the complex base. For example, a Gaussian number N can be represented as follows:

$$N = r_k \times b^k + r_{k-1} \times b^{k-1} + \ldots + r_1 \times b^1 + r_0 \times b^0 + \quad (1)$$
$$r_{-1} \times b^{-1} + r_{-2} \times b^{-2} + \ldots$$
$$= \sum_{j=-\infty}^{k} r_j b^j$$

or $$N = \sum_{j=-\infty}^{k} r_j b^j = (r_k r_{k-1} r_{k-2} \ldots r_1 r_0 \cdot r_{-1} r_{-2} \ldots)_b \quad (2)$$

where $r_j \in S = \{0, 1\}, k = 0, 1, 2, \ldots$

A complex number can be converted or coded into digital information such as a binary sequence. By way of example, a complex number is written as x+iy, where x and y can be integers or decimals.

FIG. 1 shows a table 100 illustrating coding a Gaussian integer into a binary sequence in accordance with an example embodiment.

A Gaussian integer is a complex number with both its real part and imaginary part being integers. As illustrated in FIG. 1, the binary sequence or binary code is a 0~4 sequence. For illustrative purpose only, b=ξ+iη is selected as a complex base, where ξ=±1 and η=±1. A Gaussian integer is written as $U_0+iV_0$, and the 0~1 sequence that is obtained from conversion or coding of the Gaussian integer is illustratively written as $e_n e_{n-1} e_{n-2} e_1 e_0$.

As an example, to determine $\{e_j\}$, j=0, 1, . . . , n, let $U_0+iV_0$ be:

$$U_0+iV_0=e_n \times b^n+e_{n-1} \times b^{n-1}+ \ldots +e_1 \times b^1+e_0 \times b^0. \quad (3)$$

By way of example, in order to construct a recursive formula or recursive representation to obtain the binary sequence, then formula (3) can be rewritten as:

$$U_0 + iV_0 = (\xi + i\eta)(U_1 + iV_1) + e_0 \quad (4)$$
$$= \xi U_1 - \eta V_1 + (\eta U_1 + \xi V_1)i + e_0,$$

where $e_j \in \{0, 1\}$, j=0, 1, . . . , n. Then it is obtained that:

$$U_0=\xi U_1-\eta V_1+e_0,$$

$$Q_0=\eta U_1+\xi V_1.$$

Thus it is further obtained that:

$$\begin{pmatrix} U_{k+1} \\ V_{k+1} \end{pmatrix} = \begin{pmatrix} \xi & \eta & -\xi \\ -\eta & \xi & \eta \end{pmatrix} \begin{pmatrix} \frac{U_k}{2} \\ \frac{V_k}{2} \\ \frac{e_k}{2} \end{pmatrix}$$

The recursive formula is obtained as:

$$U_{k+1} = \frac{\xi U_k + \eta V_k - \xi e_k}{2}, \tag{5}$$

$$V_{k+1} = \frac{-\eta U_k + \xi V_k + \eta e_k}{2},$$

where $k = 0, 1, \ldots$.

By way of example, if $U_k$ and $V_k$ have the same parity (i.e., both are even or both are odd), then $e_k=0$; otherwise $e_k=1$. When $U_k=0$ and $V_k=0$, the counting or recursive process is stopped. According to the calculated results, the obtained result is $e_n e_{n-1} e_{n-2} \ldots e_1 e_0$. A given Gaussian integer $U_0+iV_0$ can thus be converted or coded into a 0~1 sequence based on a complex base b following the formula (5).

By way of example, the complex base is selected as b=−1+i. A recursive formula is obtained as shown by formula (6).

$$U_{k+1} = \frac{-U_k + V_k + e_k}{2}, \tag{6}$$

$$V_{k+1} = \frac{-U_k - V_k + e_k}{2}$$

where $k=0, 1, \ldots$, $e_k=|U_k-V_k| \mod 2$. The scheme is illustratively shown in the table 100 of FIG. 1.

A person having ordinary skill would appreciate that the above complex base as selected is for illustrative purpose only. Other bases can also be selected or used, and in that case, the recursive formula changes accordingly.

In some example embodiments, both the real part and imaginary part of a complex number are fractions. For descriptive purpose only, such complex number is called a Gaussian fraction herein, while the real part of the Gaussian fraction is called real fraction and the imaginary part is called imaginary fraction. To code a Gaussian fraction into a binary sequence, both the real fraction and imaginary fraction are required to be coded.

In an example embodiment, to represent fractional numbers based on a complex base, one or more of the following steps are executed:
1. Converting a base 4 number ( . . . , $q_5$, $q_4$, $q_3$, $q_2$, $q_1$, $q_0$) to base −4 by replacing each digit in odd location ($q_1$, $q_3$, $q_5$, . . . ) with its corresponding negative value to get a new number ( . . . , $-q_5$, $q_4$, $-q_3$, $q_2$, $-q_1$, $q_0$).
2. Normalizing the new number (i.e., getting each digit in a range from 0 to 3) by repeatedly adding four to the negative digits and adding one to the digits on the immediate left of each of the negative digits. If the digit is 4, the digit is replaced with zero and the digit on its left is subtracted by one.
3. In order to represent the 0~1 sequence of imaginary fractions, these imaginary fractions are based on the base −1+i, and each digit in base −4 representation is replaced with the corresponding four bit sequence (0→0000; 1→0001; 2→1100; 3→1101).

One example embodiment is directed to a 0~1 sequence representation in base −1+i for 0.65. The process is illustratively shown as follows:
1: $(0.65+0i)_{base -1+i}=0.221212 \ldots _{base\ 4}$, the representation based on base 4 can be obtained as follows:
   0.65×4=2.6000 ⇒ The factional part is 0.6;
   0.6000×4=2.4000 ⇒ The factional part is 0.4;
   0.4000×4=1.6000 ⇒ The factional part is 0.6;
   0.6000×4=2.4000 ⇒ The factional part is 0.4;
   0.4000×4=1.6000 ⇒ The factional part is 0.6;
   0.6000×4=2.4000 and so on.
2: Converting the representation based on base 4 representation based on base −4,
   $(0.65+0)_{base\ -1+i}=0.(-2)2(-1)2(-1)2 \ldots _{base\ -4}$.
3: After normalization,
   $(0.65+0)_{base\ -1+i}=1.233333$ base −4.
4: Replacing each base −4 digit with its equivalent four-bit sequence,
   $(0.65+0i)_{base\ -1+i}=1.1100\ 1101\ 1101\ 1101\ 1101\ 1101 \ldots$.

In another example embodiment, in order to represent imaginary fractions in base −1+i representation, a corresponding complex binary representation of the positive integer 11 (equivalent to $i_{base\ -1+i}$) or the negative integer with 111 (equivalent to $-i_{base\ -1+i}$) is multiplied by. Therefore,
   $(0+0.65i)_{base\ -1+i}=1.1100\ 1101\ 1101\ 1101\ 1101\ 1101\times 11=0.0011\ 0100\ 0100\ 0100\ 0100\ 0111$.

The multiplication of this step meets the following multiplication rules: the 0~1 sequence multiplication of two complex numbers follows the same rules with the 0~1 sequence addition of two complex numbers. The multiplication process of two complex binary numbers is similar to multiplying two ordinary binary numbers.

In one example embodiment, a multiplication of 2+3i and 1 i is shown in a graph 200 in FIG. 2, which is verified as follow: $1\times(-1+1)^{10}+1\times(-1+i)^9+1\times(-1++i\times(-1+i)^6+1\times(-1+i)^3+1\times(-1+i)^1=1-5i$.

In one example embodiment, to represent a Gaussian fraction in the base −1+i, the 0~1 sequence representation of integer and the 0~1 sequence representation of fraction are added by using the following addition rules:
   0+0=0;
   0+1=1;
   1+0=1;
   1+1=1100;
   11+111=0.

For example, the 0~1 sequences representation of integers and fractions are obtained by schemes as stated above.

Another example embodiment is directed to a 0~1 sequence representation in base 1+i for 60.65+60.65i with the process as follows:
   using the method as stated with reference to FIG. 1 to obtain the 0~1 sequence of 60+0i: 11101000000010000, then $$60.65 = 60 + 0.65$$

$$= 11101000000010000 + 1.11001101110110111011101$$

$$= 11101000000010001.11001101110110111011101.$$

The addition of this step follows the addition rules as stated above.

For the imaginary part, $$60.65i = 11101000000010001.11001101110111011101 \times 11$$
$$= 111000000110010.011101000100010001000111.$$

The multiplication of this step follows the multiplication rules as stated above such as with reference to FIG. 2.

For the addition of the real part and the imaginary part, $$60.65 + 60.65i = 11101000000010001.11001101110111011101 +$$
$$11000000110010.011101000100010001000111$$
$$= 10000000010100.101001101000011010000110.$$

The addition of this step follows the addition rules as stated above.

FIG. 3 shows a flow chart in accordance with an example embodiment. The method improves information security in an unconventional way by generating a key with which a first multimedia content is encrypted or embedded into a second multimedia content.

Example methods as illustrated can be executed by a computer that incorporates software, hardware, and combinations of hardware and software. The computer includes electronic devices such as a computer system or electronic system, wearable electronic devices, servers, portable electronic devices, handheld portable electronic devices, and hardware (e.g., a processor, processing unit, digital signal processor, microprocessor, microcontroller, controller, application specific integrated circuit (ASIC), field programmable gate arrays (FPGAs), etc.).

Block 310 states generating a first representation on a complex plane. The first representation is a representation of a first multimedia content or multimedia information. For example, the first multimedia content is texts such as Chinese characters and English letters, images, audio, and video information etc. In an example embodiment, the first multimedia content is private information or confidential data that is expected to be protected by being embedded or encrypted into public information to improve information security such that the private information is not accessed without authorization.

Block 320 states generating a second representation on the complex plane. The second representation is a representation of a second multimedia content or multimedia information. For example, the second multimedia content is texts such as Chinese characters and English letters, images, audio, and video information etc. In an example embodiment, the second multimedia content is public information that carries private information that is encrypted such that the private information is not accessed without authorization when being transmitted to one or more destinations such as a client terminal.

By way of example, the multimedia information exists in a variety of forms including text, images, charts, audio, videos, etc. The multimedia information can be stored and processed in a computer as binary codes. By way of example, the first multimedia content and the second multimedia content can be of same type or different types. As an example, the first multimedia content is a text, and the second multimedia content is an image. The text that carries private information is encrypted into the image that is delivered to one or more users. For example, the text carries personal information of a person to claim ownership of the image created by the person.

In an example embodiment, to represent multimedia information on a complex plane, the multimedia information is first converted or transformed into a binary sequence or binary code. The binary sequence is then mapped or projected onto the complex plane.

In an example embodiment, the multimedia information are Chinese characters "中科". The Chinese character "中" is converted into its corresponding internal code "D6D0", and the Chinese character "科" is converted into its corresponding internal code "BFC6", thereby obtaining internal codes "D6D0BFC6" for the Chinese characters "中科".

In an example embodiment, the multimedia information is western information such as English letters (e.g., 26 alphabetic characters, 10 numerical digits, and from 11 to 25 special graphic symbols). The western information, for example, are converted into a plurality of American Standard Code for Information Interchange (ASCII) codes. The ASCII code converts 128 specified characters into eight-bit integers, usually the highest bit (e.g., parity bit) being set to 0. For example, the ASCII code of letter "A" is "01000001", and the ASCII code of number "9" is "00111001", and the ASCII code of symbol "!" is "00100001". The ASCII code is further converted or coded into a binary sequence.

In some example embodiments, the multimedia information is one or more images. As an example, in a two-dimensional space, a grey-scale image corresponds to a two-dimensional (2D) matrix. The 2D matrix is linearized to obtain a linearized sequence in a one-dimensional space that is further converted into a binary sequence. FIGS. 4A-4F show a number of linearization schemes 410-460. For each scheme, a linearized sequence is obtained by starting from the upper left and running along the broken line as shown across each pixel or pixel block. In an example embodiment, the multimedia information is a color image. The color image is divided or partitioned into three components (e.g., Red (R), Green (G) and Blue (B)) by dimension-reduction treatment, and then each component is linearized such that three linearized sequences are obtained corresponding to the three components respectively.

By way of example, the first multimedia content is converted or coded into a first binary sequence that is mapped onto the complex plane such that the first representation is generated. The second multimedia content is converted or coded into a second binary sequence that is mapped onto the complex plane such that the second representation is generated. For example, the first representation is a point on the complex plane and the point corresponds to a complex number, and the second representation is another point on the complex plane and the another point corresponds to another complex number.

In an example embodiment, a complex base has a form of $b=\xi+i\eta$, where $\xi=\pm 1$, and $\eta=\pm 1$. A 0~1 sequence has a form of $e_n e_{n-1} e_{n-2} \ldots e_1 e_0 . e_{-1} e_{-2} \ldots e_{-m}$, where $e_n e_{n-1} e_{n-2} \ldots e_1 e_0$ is the integer part and $e_{-1} e_{-2} \ldots e_{-m}$ is the fractional part. n and m are whole numbers. Based on the complex base b, the 0~1 sequence is projected onto a complex plane.

By way of example, let $(\xi+i\eta)^k = r_k + i s_k$. Under this notation, when k=0, then $r_0=1$, $s_0=0$. In order to construct a recursion formula, let $$(\xi + i\eta)^k = (\xi + i\eta)(r_{k-1} + is_{k-1}) \qquad (7)$$
$$= \xi r_{k-1} - \eta s_{k-1} + i(\eta r_{k-1} + \xi s_{k-1}).$$

Then $$r_k = \xi r_{k-1} - \eta s_{k-1}, \qquad (8)$$
$$s_k = \eta r_{k-1} + \xi s_{k-1}.$$

Thus $$\begin{pmatrix} r_k+1 \\ s_k+1 \end{pmatrix} = \begin{pmatrix} \xi & -\eta \\ \eta & \xi \end{pmatrix} \begin{pmatrix} r_k \\ s_k \end{pmatrix}.$$

For the integer part $e_n e_{n-1} e_{n-2} \ldots e_1 e_0$, the following formula (9) is obtained from the formula (8) when $b=-1+i$ is selected as the complex base as an example.

$$r_k = -r_{k-1} - s_{k-1},$$
$$s_k = -r_{k-1} - s_{k-1}, \qquad (9)$$

For the fractional part $e_{-1} e_{-2} \ldots e_{-m}$, the formula (10) is obtained from the formula (8) when $b=-1+i$ is selected as the complex base as an example.

$$r_{k-1} = -\frac{r_k - s_k}{2}, \qquad (10)$$
$$s_{k-1} = -\frac{r_k + s_k}{2}.$$

From $$\begin{aligned}
U + iV &= e_n \times b^n + e_{n-1} \times b^{n-1} + \ldots + e_1 \times b^1 + \\
&\quad e_0 \times b^0 + e_{-1} \times b^{-1} + e_{-2} \times b^{-2} + \ldots + \\
&\quad e_{-m} \times b^{-m} \\
&= e_n \times (\xi + i\eta)^n + e_{n-1} \times (\xi + i\eta)^{n-1} + \ldots + \\
&\quad e_1 \times (\xi + i\eta)^1 + e_0 \times (\xi + i\eta)^0 + e_{-1} \times (\xi + i\eta)^{-1} + \\
&\quad e_{-2} \times (\xi + i\eta)^{-2} + \ldots + e_{-m} \times (\xi + i\eta)^{-m} \\
&= e_n(r_n + is_n) + e_{n-1}(r_{n-1} + is_{n-1}) + \ldots + \\
&\quad e_1(r_1 + is_1) + e_0 + e_{-1}(r_{-1} + is_{-1}) + \\
&\quad e_{-2}(r_{-2} + is_{-2}) + \ldots + e_{-m}(r_{-m} + is_{-m}) \\
&= e_n r_n + e_{n-1} r_{n-1} + \ldots + e_1 r_1 + e_0 + e_{-1} r_{-1} + \\
&\quad e_{-2} r_{-2} + \ldots + e_{-m} r_{-m} + i(e_n s_n + e_{n-1} s_{n-1} + \ldots + \\
&\quad e_1 s_1 + e_{-1} s_{-1} + e_{-2} s_{-2} + \ldots + e_{-m} s_{-m}),
\end{aligned}$$

where n, m≥0, the following formula is obtained:

$$U = \sum_{j=-m}^{n} e_j r_j = \underbrace{\sum_{j=-m}^{-1} e_j r_j}_{\text{fractional part}} + \underbrace{\sum_{j=0}^{n} e_j r_j}_{\text{integer part}}, \qquad (11)$$

$$V = \sum_{\substack{j=-m, \\ j \neq 0}}^{n} e_j s_j = \underbrace{\sum_{j=-m}^{-1} e_j s_j}_{\text{fractional part}} + \underbrace{\sum_{j=1}^{n} e_j s_j}_{\text{integer part}}.$$

Where U+iV is a Gaussian integer corresponding to a 0~1 sequence based on the complex base $b=\xi+i\eta$. U+iV corresponds to a point on the complex plane and is thus a representation of the 0~1 sequence on the complex plane.

Block 330 states improving information security by generating a key by determining a relationship between the first representation and the second representation on the complex plane. For example, the relationship is determined as a complex operation between the first representation and the second representation on the complex plane. For example, the key is generated by subtracting the second complex number from the first complex number.

In an example embodiment, a multimedia content (MC1) is simple Chinese characters "澳门科技大学" that are converted into internal codes as "B0C4 C3C5 BFC6 BCBC B4F3 D1A7" The internal codes are coded into a 0~1 sequence as "1011000011000100 1100001111- 0001011- 011111111000110 1011110010111100 1011010011110011 1101000110100111". Selecting b=-1+i as a complex base, following a scheme 500 as shown in FIG. 5, the 0~1 sequence is mapped onto a complex plane and a representation of the Chinese characters "澳门科技大学" is obtained as:

The real part $U_1$=150115170289844;
The imaginary part $V_1$=213248109241101.

In another example embodiment, a multimedia content (MC2) is English characters "MUST" that are converted into ASCII codes as "77 85 83 84". The ASCII codes are coded into a 0~1 sequence as "01001101 01010101 01010011 01010100". Selecting b=-1+i as a complex base, following a scheme 500 as shown in FIG. 5, the 0~1 sequence is mapped onto a complex plane and a representation of the English characters "MUST" is obtained as:

The real part $U_2$=11452;
The imaginary part $V_2$=34454.

In another example embodiment, a multimedia content (MC3) is English characters "Warm Welcome" that are converted into ASCII codes as "87 97 114 109 32 87 101 108 99 11 109 101". The ASCII codes are coded into a 0~1 sequence as "01010111 01100001 01110010 0110110100100000 01010111 01 100101 01101100 01100011 01101111 01101101 01100101". Selecting b=-1+i as a complex base, following a scheme 500 as shown in FIG. 5, the 0~1 sequence is mapped onto a complex plane and a representation of the English characters "Warm Welcome" is obtained as:

The real part $U_3$=64908828457355;
The imaginary part $V_3$=127903172154690.

Figure 6:
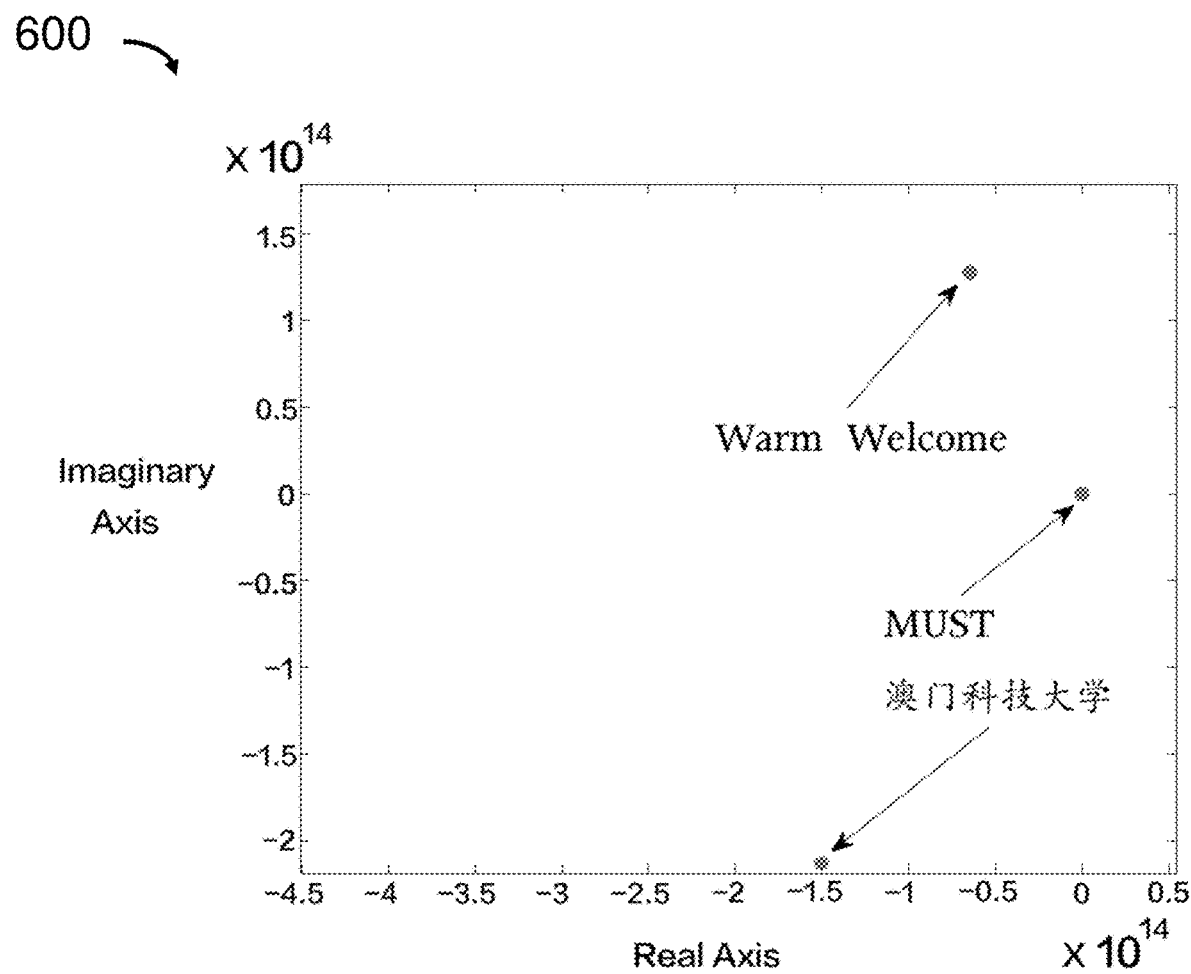
FIG. 6 shows a graph illustrating three representations of corresponding multimedia information on a complex plane in accordance with an example embodiment.

The representations of the multimedia contents (MC1, MC2, and MC3) are shown in the graph 600 in FIG. 6. As shown by way of example, the representation of each multimedia content is a point on the complex plane.

Figure 7A:
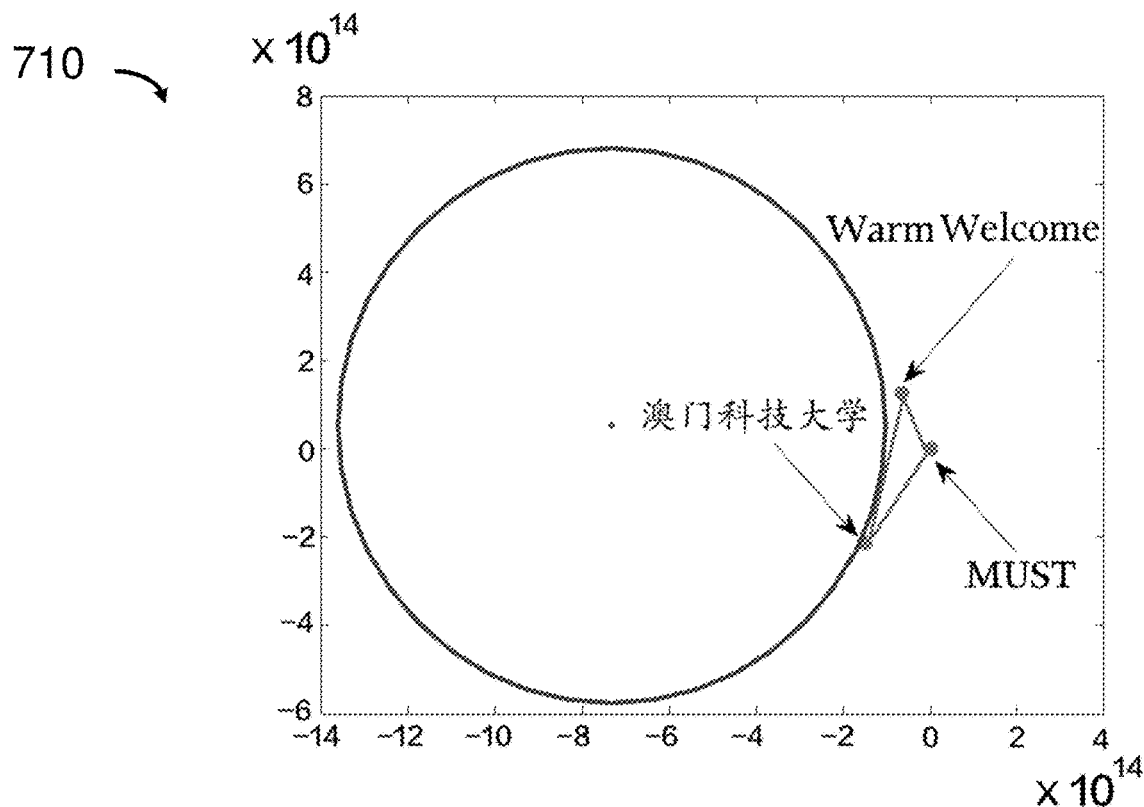
FIG. 7A shows a graph illustrating a relationship between different multimedia information on a complex plane in accordance with an example embodiment.
Figure 7B:
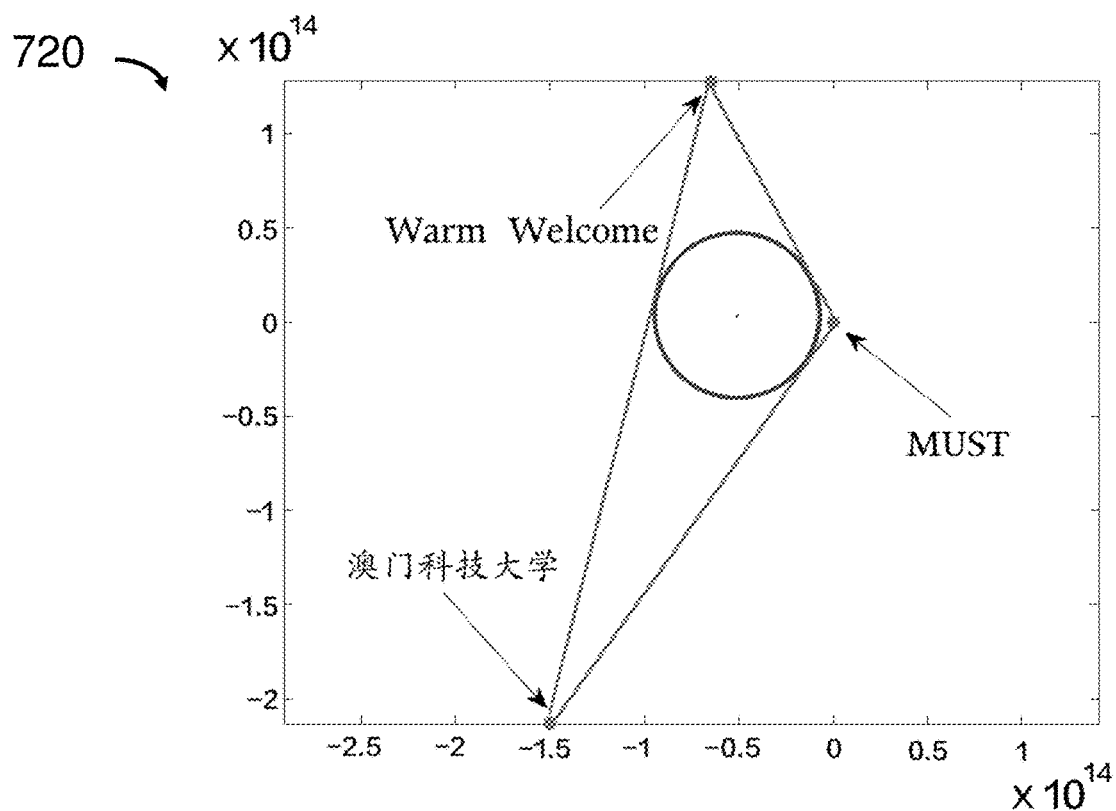
FIG. 7B shows a graph illustrating a relationship between different multimedia information on a complex plane in accordance with an example embodiment.

When a plurality of multimedia contents are represented on a complex plane, the relationships between these multimedia contents can be established by plane geometry on their representations. The relationships are illustratively shown in graphs 710-720 in FIGS. 7A-7B. The graphs 710-720 show three points corresponding to MC1-MC3 respectively that form a triangle on the complex plane. The relationships can be established with great flexibility due to significant number of complex operations in the complex plane such that it would be difficult for untrusted parties to decrypt the information. By way of example, the graph 710 uses described circles (a triangle has three excircles, and the graph 710 shows one for illustration). The coordinate of the excenter for the excircle is $(-7.3135 \times 10^{14}, -2.7293 \times 10^{14})$, and the value of the exradius is $6.2834 \times 10^{14}$. The graph 720 uses an inscribed circle. The coordinate of the incenter is $(-5.0881 \times 10^{13}, 3.6635 \times 10^{12})$, and the value of the inradius is $-4.3715 \times 10^{13}$.

In an example embodiment, the excenter, the exradius and two of three multimedia contents are known, the third multimedia content can be calculated based on the known information. In another example embodiment, the incenter, the inradius and two of three multimedia contents are known, the third multimedia content can be calculated based on the known information.

By way of example, the relationship is used as a key to encrypt information. In an example embodiment, the representation of the multimedia content "澳门科技大学" is $Z_1 = -150115170289844 - 2132481092411101i$. The representation of the multimedia content "Warm Welcome" is $Z_3 = -64908828457355 + 127903172154690i$. The key is generated as $Z' = Z_1 - Z_3$ and is used to encrypt the information "澳门科技大学" or embedded the information "澳门科技大学" into the information "Warm Welcome" such that unauthorized person cannot access to the encrypted information.

In an example embodiment, the representation of the multimedia content "MUST" is $Z_2 = 11452 + 34454i$. The representation of the multimedia content "Warm Welcome" is $Z_3 = 64908828457355 + 127903172154690i$. The key is generated as $Z'' = Z_2 - Z_3$ and is used to encrypt the information "MUST" or embedded the information "MUST" into the information "Warm Welcome" such that unauthorized person cannot access to the encrypted information.

In an example embodiment, to restore the private information "澳门科技大学" or "MUST", since the key of Z', Z", and the representation of the multimedia content "Warm Welcome" (i.e., $Z_3$) are known, the representations $Z_1$ or $Z_2$ of the private information are obtained. Thus, private information can be decrypted with the key and public information and then displayed or shown to a user.

In an example embodiment, the multimedia content is 2D binary images. The binary images are download from MPEG 7 Shape Matching (website: http://www.dabi.temple.edu/_shape/MPEG7/index.html). The size of each binary image is set to be 30×30 pixels, and thus the length of 0~1 sequence for each binary image is 30×30×1=900.

Figure 4A:
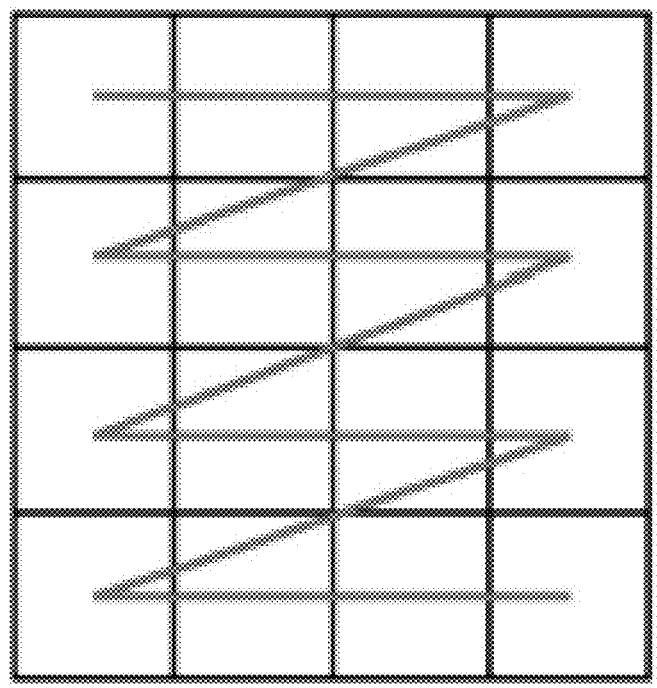
FIG. 4A shows a linearization scheme for an image in accordance with an example embodiment.
Figure 4B:
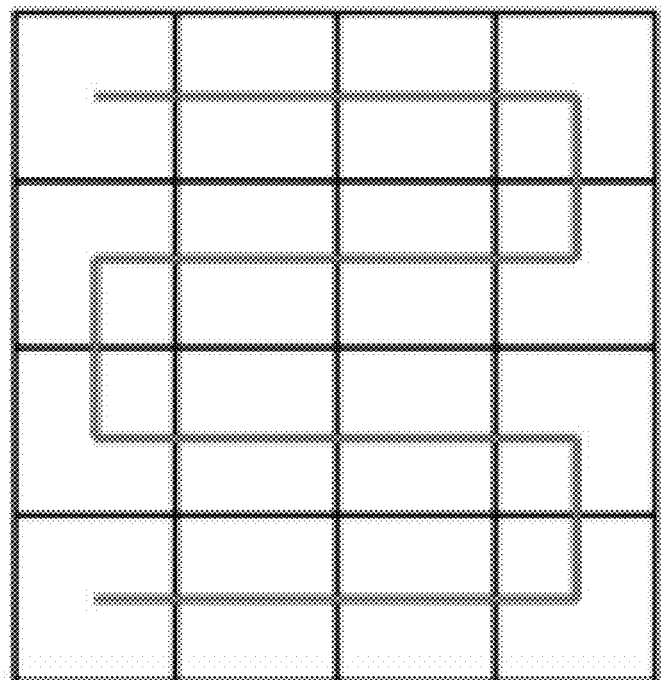
FIG. 4B shows a linearization scheme for an image in accordance with an example embodiment.
Figure 4C:
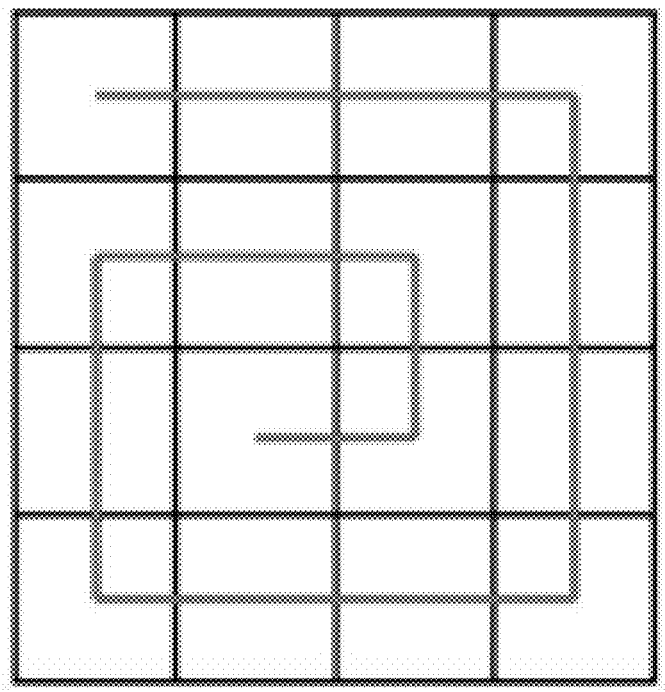
FIG. 4C shows a linearization scheme for an image in accordance with an example embodiment.
Figure 4D:
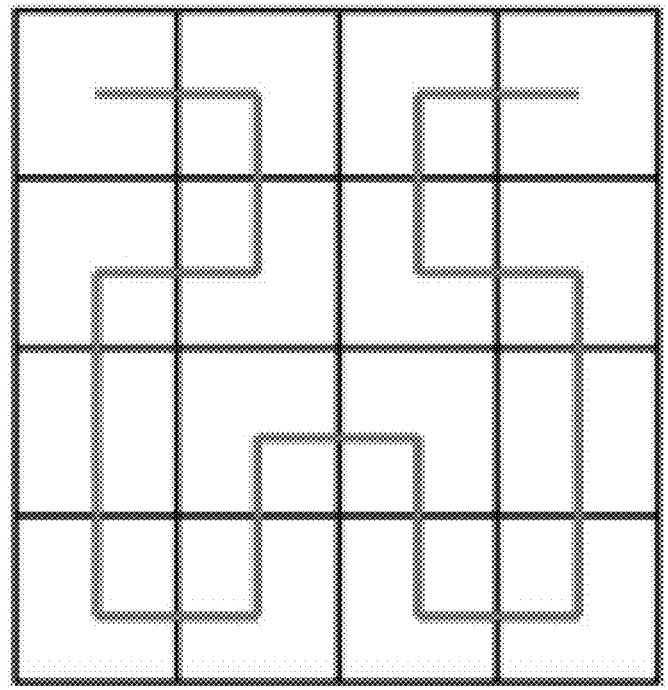
FIG. 4D shows a linearization scheme for an image in accordance with an example embodiment.
Figure 4E:
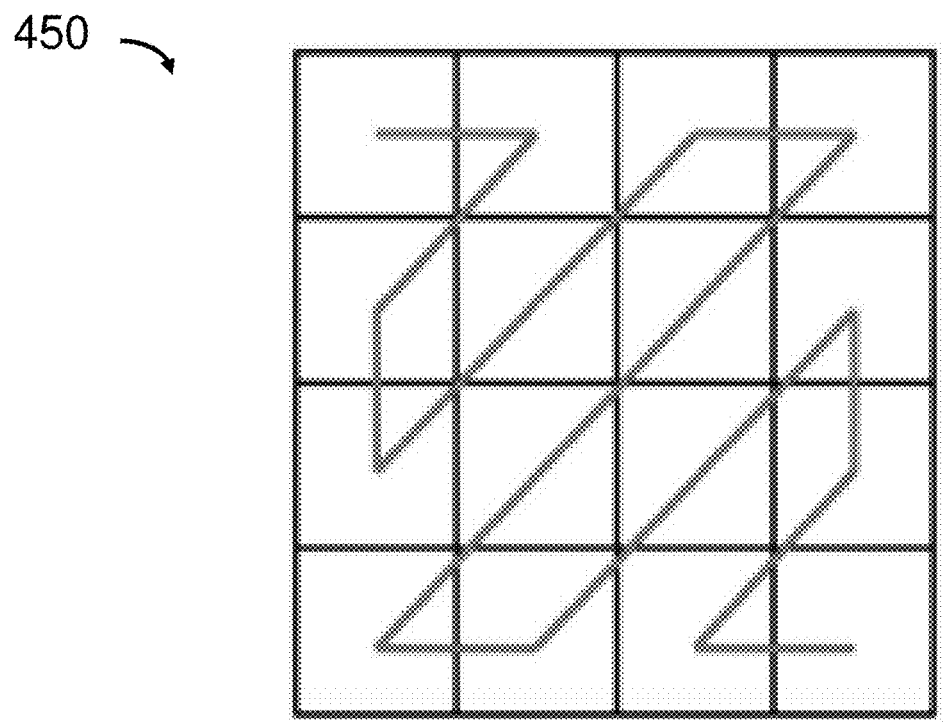
FIG. 4E shows a linearization scheme for an image in accordance with an example embodiment.
Figure 4F:
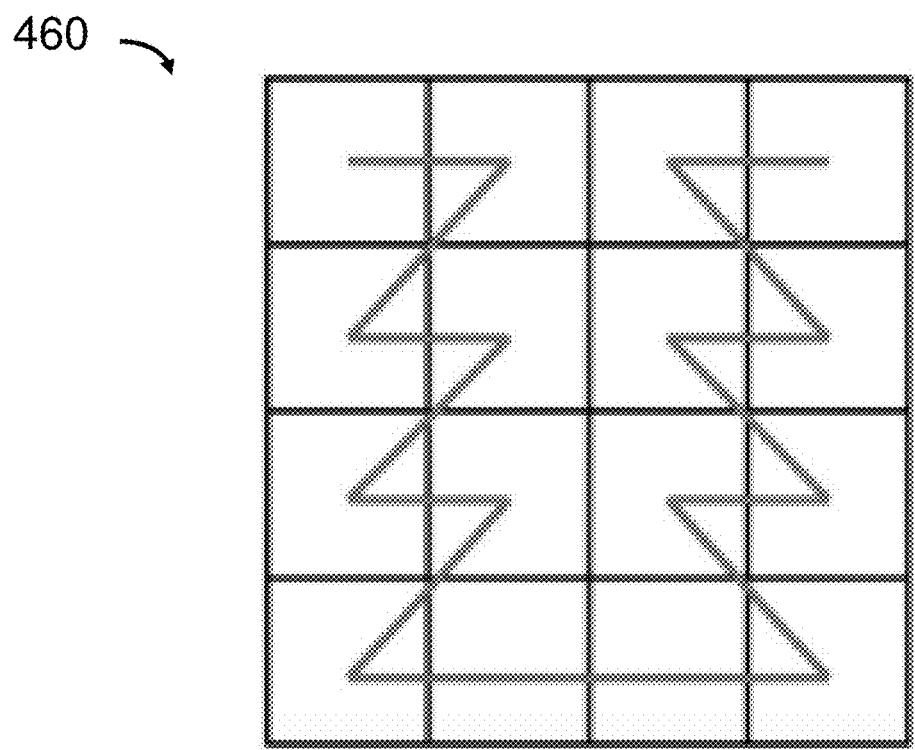
FIG. 4F shows a linearization scheme for an image in accordance with an example embodiment.

By way of example, a linearization scheme as shown in FIG. 4A is adopted to obtain a binary sequence for each binary image. Selecting $b = -1 + i$ as a complex base, the representation (e.g., the complex numbers) corresponding to these binary images are shown in the table 800 in FIG. 8. After the binary images are represented on a complex plane, the relationships between different binary images are established by the method of plane geometry. In an example embodiment, image arithmetic is defined on the complex plane after the images are represented on the complex plane.

In an example embodiment, a plurality of operations or functions are defined as follows:

Function G(x): x→N is a conversion function of binary encoding for multimedia information, where x represents the original multimedia information, and N represents the 0~1 sequence for this original multimedia information.

Function $G^{-1}(N)$: N→x is an inverse process of function G(x).

Function $F_b(N)$: N→(p, q) is a projection process that projecting a 0~1 sequence of multimedia information to a point on a complex plane, where p and q represent the real part and the imaginary part of the corresponding complex number on the complex plane, respectively.

Function $F^{-1}(N)$: (p, q)→N is an inverse process of function $F_b(N)$.

Function $T(x) = F_b(G(x))$: x→(p, q) is a process of converting multimedia information into complex numbers.

Function $R(P_0, P_1)$: $P_0 \leftrightarrow P_1$ is defined as the relationships (arithmetic, conjugate, etc.) between $P_0$ and $P_1$, where $P_0$ and $P_1$ represent two different multimedia information.

One example embodiment includes a representation process of one image to another image. The function G(x) acts on public information $M_1$. A 0~1 sequence is generated and noted as $G(M_1) = N_{M_1}$. The 0~1 sequence is converted into a point $P_0(P_0, P_1) = (p_0, q_0)$ on a complex plane. This procedure is denoted as: $F_{-i+i}(N_{M_1}) = (p_0, g_0) = P_0$. Using the same function G(x) for private information S, and $F_{-1+i}(N_S) = (p_1, q_1) = P_1$ is obtained. Thus, on the complex plane, the relationship $(R(P_0, P_1): P_0 \leftrightarrow P_1)$ between these two points is determined and used as a key to encrypt the private information. This scheme is illustratively shown in the table 900 in FIG. 9.

In another example, the hiding object or private information is represented by $M_1$. The 0~1 binary sequence of the hiding object is reconstructed with a series of inverse transform functions. Since the 0~1 sequence and the point on the complex plane have a one-to-one correspondence, the inverse transform function restores the 0~1 sequence from the corresponding point on the complex plane.

In one example embodiment, the arithmetic of an image "$I_C$" and an image "$I_D$" is defined as follows:

$$I_C \tilde{+} I_D = T^{-1}(T(I_C) + T(I_D)) = T^{-1}((p_C + p_D), (q_C + q_D)) = I;$$

$$I_C \tilde{-} I_D = T^{-1}(T(I_C) - T(I_D)) = T^{-1}((p_C + p_D), (q_C + q_D)) = I;$$

$$I_C \tilde{\times} I_D = T^{-1}(T(I_C) \times T(I_D)) = |T^{-1}((p_C \times p_D), (q_C \times q_D)) = I;$$

$$I_C \tilde{\div} I_D = T^{-1}(T(I_C) \div T(I_D)) = T^{-1}((p_C \div p_D), (q_C \div q_D)) = I;$$

where $\tilde{+}, \tilde{-}, \tilde{\times}$ and $\tilde{\div}$ are addition, subtraction, multiplication and division on the complex plane, respectively. By way of example, the conjugation of the image "$I_C$" is defined as:

$$I_C' = T^{-1}(p_C, -q_C).$$

The inverse of the image "$I_C$" is defined as:

$$-I_C = T^{-1}(-p_C, -q_C).$$

The definition of image arithmetic is for illustrative purpose only. Arithmetic for other multimedia contents such as texts can also be defined similarly.

By way of example, the addition and subtraction of different multimedia information are equivalent to the addition and subtraction of vectors on a complex plane. Vector transformation (rotation and expansion) is the geometric significance of multiplication and division. For example, multiplication by −i is equivalent to rotation of 90° clockwise, and the geometric significance of $i^2$ is equivalent to consecutive 90° rotations twice. By way of example, the problems of different multimedia information arithmetic are converted into geometric problems. By way of example, multimedia information is represented as a point on a complex plane, and different multimedia information correspond to different points.

In one example embodiment, two multimedia contents are two greyscale digital images with the size being M×N pixels. One image is noted as $P = [p_{ij}]$, and the other image is noted as $Q = [q_{ij}]$ (i=1, 2, ..., M, j=1, 2, ..., N). Let the value of i is m and the value of j is η (m∈{0, 1, 2, ..., M}, n∈{0, 1, 2, ..., N}), and $p_{mn}$ and $q_{mn}$ represent the grayscale value. Hence, $p_{mn}$ and $q_{mn} \in \{0, 1, 2, ..., 255\}$. Let $c_{mn} = p_{mn} + iq_{mn}$ such that the complex number $c_{mn}$ is constructed from the gray scale values of the pixel points of the greyscale digital images P and Q. The number of $c_{mn}$ is M×N. A matrix $C = [\tilde{c}_{mn}]$ can be obtained, where $c_{mn} \leftrightarrow (0\sim1 \text{ sequence})_{mn} \leftrightarrow (0\sim1 \text{ sequence to the representation based on base } 10)_{mn} = \tilde{c}_{mn}$, with $\tilde{c}_{mn}$ being an integer. Thus, the digital matrix with size M×N is obtained as:

$$C = \begin{bmatrix} \tilde{c}_{11} & \tilde{c}_{12} & \cdots & \tilde{c}_{1N} \\ \tilde{c}_{21} & \tilde{c}_{22} & \cdots & \tilde{c}_{2N} \\ \vdots & \vdots & \ddots & \vdots \\ \tilde{c}_{M1} & \tilde{c}_{M2} & \cdots & \tilde{c}_{MN} \end{bmatrix}$$

Figure 12:
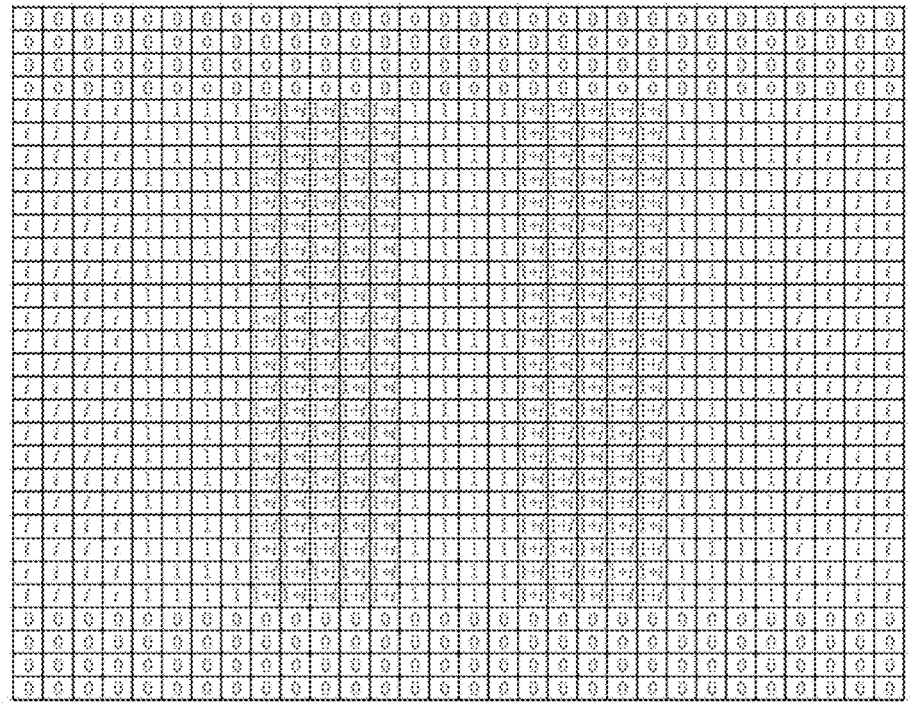
FIG. 12 shows a representation of $c_{mn}$ in accordance with an example embodiment.
Figure 13:
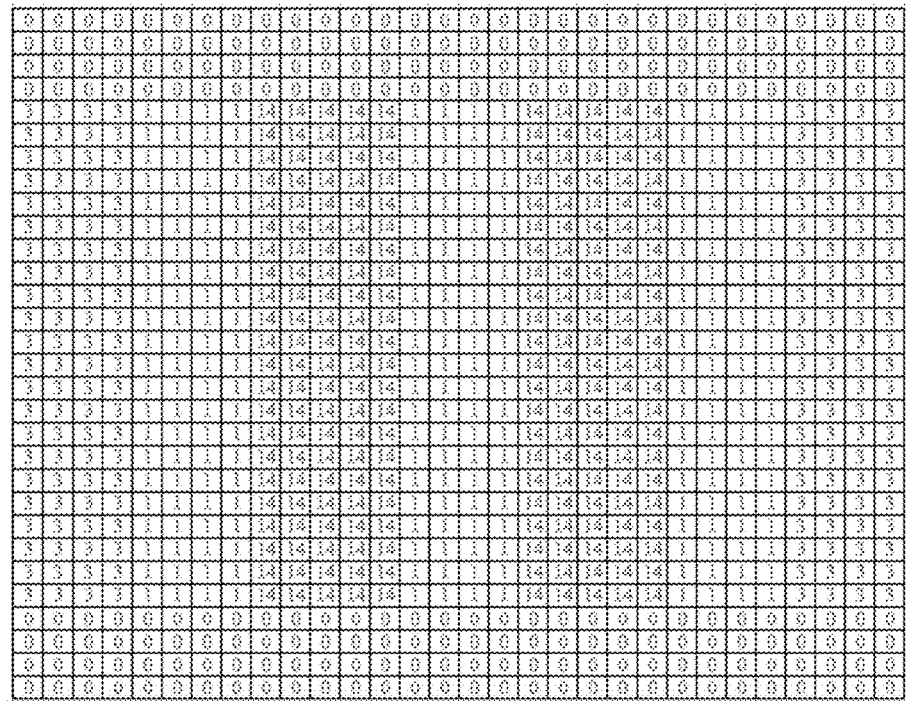
FIG. 13 shows a representation of $\tilde{c}_{mn}$ in accordance with an example embodiment.

In an example embodiment, the initial images are binary images, so the value of each pixel is 0 or 1. Thus, $\tilde{c}_{mn} \in \{0+0i; 1+0i; 0+1i; 1+1i\}$, and the elements of the digital matrix C' are 0, 1, 11 and 1110 derived by using the scheme in FIG. 1. The elements of the corresponding matrix C with decimal system are 0, 1, 3 and 14. The process is illustratively shown by graphs 1100, 1200, and 1300 in FIGS. 11-13.

In another example embodiment, the matrix C is known such that the binary images P and Q are obtained based on the known information of the matrix C. The example method is advantageous over existing or traditional methods because the traditional addition method of matrix addition is irreversible. For example, a numerical matrix A is obtained by the sum of two numerical matrices M and N with same dimension. The two numerical matrices M and N cannot be obtained by the numerical matrix A.

In one example embodiment, the matrix C is considered as the initially digital matrix P or Q. A third image is added and the same operations as mentioned above is used to obtain a new matrix. The example method is applicable to scenarios where there are more than three multimedia contents such as images.

Figure 14:
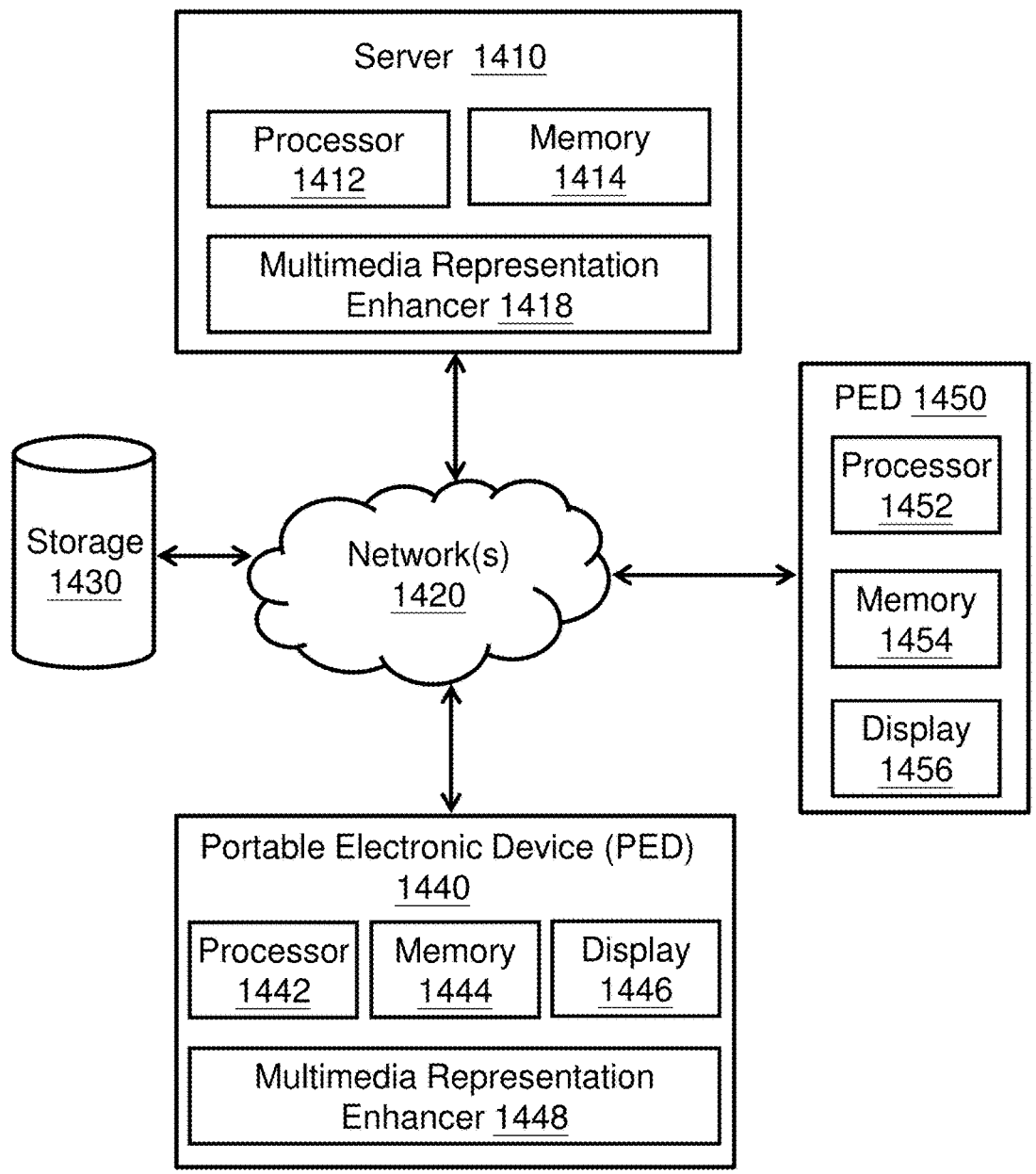
FIG. 14 shows a computer system in accordance with an example embodiment.

FIG. 14 shows a computer system or electronic system in accordance with an example embodiment. The computer system 1400 includes one or more computers or electronic devices (such as one or more servers) 1410 that includes a processor or processing unit 1412 (such as one or more processors, microprocessors, and/or microcontrollers), one or more components of computer readable medium (CRM) or memory 1414, and a multimedia representation enhancer 1418.

The memory 1414 stores instructions that when executed cause the processor 1412 to execute a method discussed herein and/or one or more blocks discussed herein. The multimedia representation enhancer 1418 is example of specialized hardware and/or software that assist in improving performance of a computer and/or execution of a method discussed herein and/or one or more blocks discussed herein. Example functions of a multimedia representation enhancer are discussed in connection with FIG. 3.

In an example embodiment, the computer system 1400 includes a storage or memory 1430, a portable electronic device or PED 1440 in communication over one or more networks 1420.

The storage 1430 can include one or more of memory or databases that store one or more of image files, audio files, video files, software applications, and other information discussed herein. By way of example, the storage 1430 store image, instructions or software application that are retrieved by the server 1410 over the network 1420 such that a method discussed herein and/or one or more blocks discussed herein are executed.

The PED 1440 includes a processor or processing unit 1442 (such as one or more processors, microprocessors, and/or microcontrollers), one or more components of computer readable medium (CRM) or memory 1444, one or more displays 1446, and a multimedia representation enhancer 1448.

The PED 1440 can execute a method discussed herein and/or one or more blocks discussed herein and display multimedia contents (such as texts and images, frames of a video) or representation of the multimedia contents for review. Alternatively or additionally, the PED 1440 can retrieve files such as images and software instructions from the storage 1430 over the network 1320 and execute a method discussed herein and/or one or more blocks discussed herein.

In an example embodiment, the computer system 1400 includes a PED 1450 that includes a processor or processing unit 1452 (such as one or more processors, microprocessors, and/or microcontrollers), one or more components of computer readable medium (CRM) or memory 1454, and one or more displays 1456.

By way of example, the PED 1450 communicates with the server 1410 and/or the storage 1430 over the network 1420 such that a method discussed herein and/or one or more blocks discussed herein is executed by the server 1410 and results are sent back to the PED 1450 for output, storage and review.

The network 1420 can include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices can couple together via one or more wires, such as a direct wired-connection. As another example, electronic devices can communicate directly through a wireless protocol, such as Bluetooth, near field communication (NFC), or other wireless communication protocol.

In some example embodiments, the methods illustrated herein and data and instructions associated therewith, are stored in respective storage devices that are implemented as non-transitory computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed a processor, controller, and other hardware discussed herein. Furthermore, blocks and/or methods discussed herein can be executed automatically with or without instruction from a user.

The methods in accordance with example embodiments are provided as examples, and examples from one method should not be construed to limit examples from another method. Figures and other information show example data and example structures; other data and other database structures can be implemented with example embodiments. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

As used herein, "multimedia" is content that uses forms such as text, audio, images, animations, video and interactive content, or combination thereof. "Multimedia", "multimedia information", and "multimedia content(s)" are used interchangeably.

As used herein, a "binary sequence" is a digital sequence consisting of 0, or 1, or both 0 and 1. "Binary sequence", "binary code", and "0~1 sequence" are used interchangeably.

As used herein, an "internal code" is a word-for-word translation of the Chinese term Neima and can be converted or coded into a binary sequence.

What is claimed is:

1. A method executed by a computer system for encryption of a confidential multimedia content with at least one public multimedia content, the method comprising:
    retrieving, by the computer system, the confidential multimedia content and the public multimedia content from a storage;
    selecting a complex base;
    mapping, by the computer system, the confidential multimedia content to a first complex number on a complex plane, based on the complex base, wherein the confidential multimedia content is represented by a sequence of numbers;
    mapping, by the computer system, each public multimedia content to a corresponding complex number on the complex plane, based on the complex base, wherein each public multimedia content is represented by a corresponding sequence of numbers;
    generating, by the computer system, a key from a relationship between the first complex number and the corresponding complex number or numbers on the complex plane; and
    encrypting, by the computer system, the confidential multimedia content with the at least one public multimedia content and the key, and
    transmitting, by the computer system, the public multimedia content and the key to an authorized receiving device, such that the confidential multimedia content is not accessed without authorization,
    wherein the key comprises at least one complex number derived from the relationship between the first complex number and the corresponding complex number or numbers.

2. The method of claim 1, further comprising:
    converting, by the computer system, the confidential multimedia content into a first binary sequence;
    converting, by the computer system, each public multimedia content into a corresponding binary sequence;
    mapping, by the computer system, the first binary sequence onto the complex plane such that the first complex number is generated; and
    mapping, by the computer system, each corresponding binary sequence onto the complex plane such that each corresponding complex number is generated.

3. The method of claim 1, further comprising:
    generating, by the computer system, the relationship by executing a complex operation between the first complex number and the corresponding complex number or numbers on the complex plane, wherein the complex operation is selected from
    complex addition,
    complex subtraction,
    complex multiplication,
    complex division,
    complex conjugate, or
    any combination of the above.

4. The method of claim 1, further comprising:
    determining, by the computer system, the relationship as a complex operation between the first complex number and the corresponding complex number or numbers on the complex plane.

5. The method of claim 1, further comprising:
    providing the confidential multimedia content as one selected from a first group consisting of text information, image information, audio information, and video information; and
    providing the at least one public multimedia content as one selected from a second group consisting of text information, image information, audio information, and video information.

6. The method of claim 1, further comprising:
    generating, by the computer system, the first complex number based on the corresponding complex number or numbers and the key;
    recovering, by the computer system, the confidential multimedia content from the first complex number.

7. A method executed by a computer system to encrypt a confidential multimedia content with at least one public multimedia content to improve security, the method comprising:
    retrieving, by the computer system, the confidential multimedia content and the public multimedia content from a storage;
    coding, by the computer system, the confidential multimedia content into a first binary sequence;
    coding, by the computer system, each public multimedia content into a corresponding binary sequence;
    selecting, by the computer system, a complex base;
    representing, by the computer system and based on the complex base, the confidential multimedia content on the complex plane by mapping the first binary sequence to a first point on the complex plane, wherein the first point corresponds to a first complex number;
    representing, by the computer system and on basis of the complex base, the public multimedia content on the complex plane by mapping each corresponding binary sequence to a corresponding point on the complex plane, wherein each corresponding point corresponds to a second corresponding complex number;
    generating, by the computer system, a key from a relationship that is a complex operation between the first complex number and the corresponding complex number or numbers on the complex plane;
    encrypting, by the computer system, the confidential multimedia content with the at least one public multimedia content and the key; and
    transmitting, by the computer system, the public multimedia content and the key to an authorized receiving device such that the confidential multimedia content is not accessed without authorization,
    wherein the key comprises at least one complex number derived from the relationship between the first complex number and the corresponding complex number or numbers.

8. The method of claim 7, further comprising:
obtaining, by the computer system, the first binary sequence and each corresponding binary sequence having a form of $e_n e_{n-1} e_{n-2} \ldots e_1 e_0 . e_{-1} e_{-2} \ldots e_{-m}$, wherein n and m are whole numbers not less than zero;
selecting, by the computer system, the complex base having a form of $b=\xi+i\eta$, wherein i is an imaginary unit such that $i^2=-1$, and $(\xi+i\eta)^k=r_k+is_k$, k is a whole number; and
representing, by the computer system and on the complex plane, the confidential multimedia content and each public multimedia content corresponding to the first complex number and each corresponding complex number that have a form of U+iV, wherein $$U = \sum_{j=-m}^{n} e_j r_j, \text{ and } V = \sum_{j=-m, j\neq 0}^{n} e_j s_j.$$

9. The method of claim 7, further comprising:
obtaining, by the computer system, the first binary sequence and each corresponding binary sequence having a form of $e_n e_{n-1} e_{n-2} \ldots e_1 e_0 . e_{-1} e_{-2} \ldots e_{-m}$ that includes an integer part $e_n e_{n-1} e_{n-2} \ldots e_1 e_0$ and a fractional part $e_{-1} e_{-2} \ldots e_{-m}$, wherein n and m are whole numbers not less than zero;
selecting, by the computer system, the complex base having a form of $b=-1+i$, wherein i is an imaginary unit such that $i^2=-1$, and $(-1+i)^k=r_k+is_k$, k is a whole number; and
determining, by the computer system, the first point and each corresponding point on the complex plane from formulae (1) and (2):
for the integer part $e_n e_{n-1} e_{n-2} \ldots e_1 e_0$, $$\begin{cases} r_k = -r_{k-1} - s_{k-1} \\ s_k = r_{k-1} - s_{k-1} \end{cases}, \quad (1)$$

and
for the fractional part $e_{-1} e_{-2} \ldots e_{-m}$, $$\begin{cases} r_{k-1} = -(r_k - s_k)/2 \\ s_k = -(r_k + s_k)/2 \end{cases}. \quad (2)$$

10. The method of claim 7, further comprising:
providing the confidential multimedia content as a first set of one or more Chinese characters;
providing each public multimedia content as a corresponding set of one or more Chinese characters;
converting, by the computer system, the first set of one or more Chinese characters into a plurality of internet codes that are coded into the first binary sequence;
converting, by the computer system, each corresponding set of one or more Chinese characters into a plurality of internet codes that are coded into the corresponding binary sequence;
mapping, by the computer system, the first binary sequence to the first point on the complex plane such that the confidential multimedia content is represented on the complex plane; and
mapping, by the computer system, each corresponding binary sequence to a corresponding point on the complex plane such that the public multimedia content is represented on the complex plane.

11. The method of claim 7, further comprising:
providing the confidential multimedia content as a first set of one or more English letters;
providing each multimedia content as a corresponding set of one or more English letters;
converting, by the computer system, the first set of one or more English letters into a plurality of American Standard Code for Information Interchange (ASCII) codes that are coded into the first binary sequence;
converting, by the computer system, each corresponding set of one or more English letters into a plurality of ASCII codes that are coded into the corresponding binary sequence;
mapping, by the computer system, the first binary sequence to the first point on the complex plane such that the confidential multimedia content is represented on the complex plane; and
mapping, by the computer system, each corresponding binary sequence to each corresponding point on the complex plane such that each public multimedia content is represented on the complex plane.

12. The method of claim 7, further comprising:
providing the confidential multimedia content as a first image that correspond to a first two-dimensional matrix;
providing each public multimedia content as a corresponding image that correspond to a corresponding two-dimensional matrix;
linearizing, by the computer system, the first two-dimensional matrix into a first linearized sequence;
linearizing, by the computer system, each corresponding two-dimensional matrix into a corresponding linearized sequence;
converting, by the computer system, the first linearized sequence into the first binary sequence;
converting, by the computer system, each corresponding linearized sequence into the corresponding binary sequence;
mapping, by the computer system, the first binary sequence to the first point on the complex plane such that the confidential multimedia content is represented on the complex plane; and
mapping, by the computer system, each corresponding binary sequence to the corresponding point on the complex plane such that the public multimedia content is represented on the complex plane.

13. The method of claim 7, further comprising:
a generating, by the computer system, the relationship between the first point and the corresponding one or more points on the complex plane with plane geometry.

14. A computer system that generates a key from a relationship to improve information security when encrypting a confidential multimedia content with at least one public multimedia content, the computer system comprising:
a processor; and
a non-transitory computer-readable storage medium having stored thereon instructions that when executed cause the processor to:
retrieve the confidential multimedia content and the public multimedia content:
select a complex base;
generate a first complex number for the confidential multimedia content on basis of the complex base;

generate a corresponding complex number for each public multimedia content on basis of the complex base;
generate the key from the relationship that is a complex operation between the first complex number and the corresponding complex number or numbers on the complex plane such that the confidential multimedia content is encrypted with the at least one public multimedia content and the key; and
improve the information security by transmitting the public multimedia content and the key to an authorized receiving device such that the confidential multimedia content is not accessed without authorization,
wherein the key comprises at least one complex number derived from the relationship between the first complex number and the corresponding complex number or numbers.

15. The computer system of claim 14, wherein the instructions that when executed further cause the processor to:
convert the confidential multimedia content into a first binary sequence;
convert each public multimedia content into a corresponding binary sequence;
map the first binary sequence onto the complex plane such that the first complex number is generated; and
map each corresponding binary sequence onto the complex plane such that each corresponding complex number is generated.

16. The computer system of claim 14, wherein a first point corresponds to the first complex number on the complex plane, and a corresponding point corresponds to each corresponding complex number on the complex plane.

17. The computer system of claim 14, wherein the confidential multimedia content and the at least one public multimedia content are selected from a group consisting of one or more Chinese characters, one or more English letters, and one or more images.

18. The computer system of claim 14, wherein the instructions that when executed further cause the processor to:
generate the first complex number based on the corresponding complex number and the key;
recover the confidential multimedia content from the first complex number; and
display the confidential multimedia content to a user.

* * * * *